United States Patent
Condrea et al.

(10) Patent No.: US 6,510,741 B2
(45) Date of Patent: Jan. 28, 2003

(54) MANOMETER HAVING DUAL PRESSURE SENSORS

(75) Inventors: Octavian G. Condrea, Santa Ana, CA (US); Stephen S. Clark, Michigan City, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 0 days.

(21) Appl. No.: 09/915,165

(22) Filed: Jul. 24, 2001

(65) Prior Publication Data

US 2002/0026837 A1 Mar. 7, 2002

Related U.S. Application Data

(60) Provisional application No. 60/230,485, filed on Sep. 6, 2000.

(51) Int. Cl.[7] .................................................. G01L 7/18
(52) U.S. Cl. ......................................................... 73/747
(58) Field of Search ........................... 73/747, 716, 717, 73/706, 724, 715, 721, 756; 303/20; 361/283.1, 283.4

(56) References Cited

U.S. PATENT DOCUMENTS

| | | | |
|---|---|---|---|
| 3,665,767 A | 5/1972 | Welk, Jr. | |
| 4,663,974 A | 5/1987 | Scherer | |
| 4,766,769 A * | 8/1988 | Nudd, Jr. et al. | 73/706 |
| 4,945,768 A | 8/1990 | Sorrells | |
| 5,187,985 A | 2/1993 | Nelson | |
| 5,371,720 A * | 12/1994 | Cuomo | 367/149 |
| 5,437,189 A | 8/1995 | Wallace | |
| 5,640,964 A | 6/1997 | Thede | |
| 5,731,522 A | 3/1998 | Sittler | |
| 6,312,061 B1 * | 11/2001 | Schliebe et al. | 303/20 |

* cited by examiner

Primary Examiner—Max Noori
Assistant Examiner—Marissa Ferguson
(74) Attorney, Agent, or Firm—Lee, Mann, Smith, McWilliams, Sweeney & Ohlson

(57) ABSTRACT

A manometer for measuring fluid pressure having a first pressure sensor and a second pressure sensor that is inverted with respect to the first pressure sensor. The first pressure sensor generates a first electrical output signal corresponding to a fluid pressure measured by a first diaphragm of the first pressure sensor. The second pressure sensor generates a second electrical output signal corresponding to a fluid pressure measured by a second diaphragm of the second pressure sensor. The first and second electrical output signals are combined into a combined electrical output signal. False readings of a change in/pressure measured by the first pressure sensor and measured by the second pressure sensor in each of the first and second electrical output signals, due to movement of the manometer, are cancelled by one another in the combined electrical output signal to provide an accurate pressure measurement regardless of movement of the manometer.

9 Claims, 3 Drawing Sheets

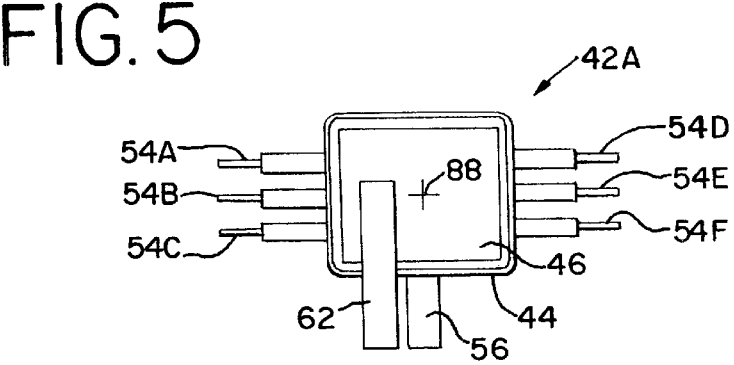
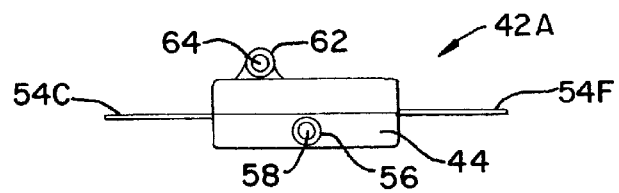
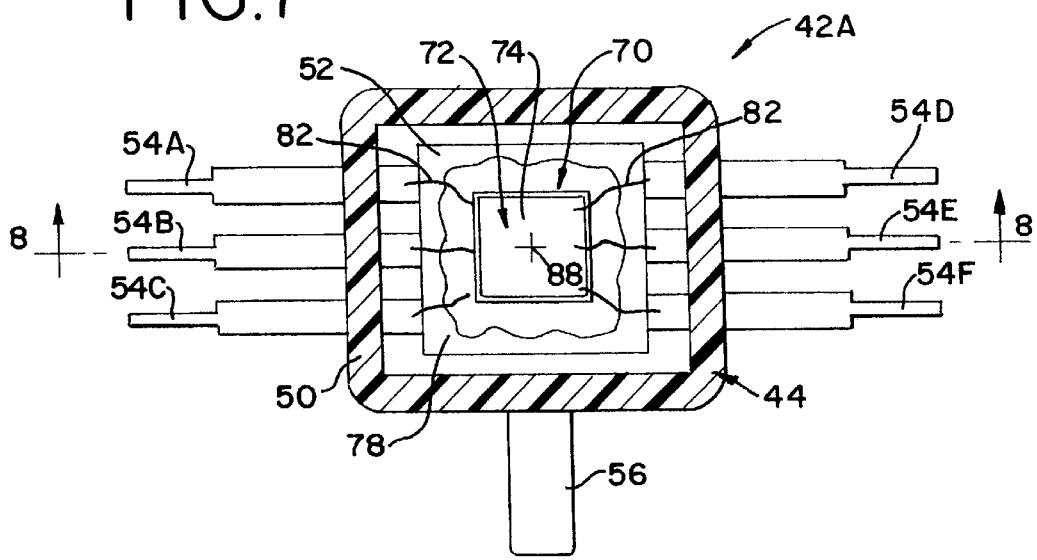
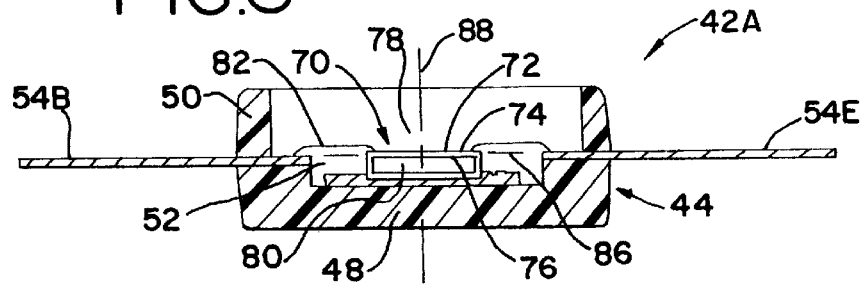

MANOMETER HAVING DUAL PRESSURE SENSORS

RELATED APPLICATIONS

This application claims the benefit of U.S. Provisional Application No. 60/230,485, filed Sep. 6, 2000.

BACKGROUND OF THE INVENTION

The present invention is directed to a manometer device having dual pressure sensors, and in particular to a manometer device wherein a first pressure sensor is inverted with respect to a second pressure sensor.

Manometers are instruments or devices for measuring the pressure of a fluid such as a gas. In normal applications, manometers that are adapted to sense and measure very low pressures are inherently sensitive to changes in the position of the manometer. This renders low pressure manometers unusable in applicating the position of the manometer may change while attempting to measure and record pressures, such as when hand-held manometers are used. Inaccuracies in pressure measurements that result from a positional change of a manometer are due to the effect of gravity on the diaphragm of the pressure sensor contained in the manometer. A change in the position or orientation of the diaphragm in the pressure sensor of the manometer causes a change in the deflection of the diaphragm due to the force of gravity and the resulting weight of the diaphragm, giving a false indication to the sensor that there has been a change in fluid pressure applied to the diaphragm, although no actual change in pressure occurred when the position of the pressure sensor was changed. For example, when a manometer is initially positioned such that the diaphragm of its sensor is generally parallel to the direction of gravitational pull, and is then rotated ninety degrees such that the diaphragm is perpendicular to the direction of gravitational pull, the pressure sensor will sense a change in the force applied to the diaphragm, but this change in force is due to the weight of the diaphragm and the gravitational force applied to the diaphragm, not a change in the pressure of the fluid that is being measured. The end result is that a manometer having a low pressure sensor previously had to be affixed to a stationary structure in the same position in which it was calibrated for use, otherwise unwanted inaccuracies would result in pressure measurement. The present invention overcomes these problems.

SUMMARY OF THE INVENTION

A manometer for measuring fluid pressure. The manometer includes a first pressure sensor including a first housing and a first cover. The first pressure sensor includes a first pressure sensor chip located in said first housing. The first pressure sensor chip includes a first diaphragm, having an interior surface and an exterior surface, that is located in a first plane. The first pressure sensor includes a first fluid chamber that is in fluid communication with the interior surface of the first diaphragm and a second fluid chamber that is in fluid communication with the exterior surface of the first diaphragm. The first pressure sensor includes a first port in fluid communication with the first fluid chamber and a second port in fluid communication with the second fluid chamber. A plurality of electrical contacts are in electrical communication with the first pressure sensor chip. The first port of the first pressure sensor is adapted to be placed in fluid communication with a source of fluid pressure, and the second port of the first pressure sensor is adapted to be placed in fluid communication with a source of fluid pressure. The first pressure sensor is adapted to provide a first electrical output signal representing a fluid pressure measured by the first diaphragm of the first pressure sensor.

The manometer includes a second pressure sensor including a second housing and a second cover. A second pressure sensor chip is located in the second housing. The second pressure sensor chip includes a second diaphragm, having an interior surface and an exterior surface, that is located in a second plane. The second pressure sensor includes a first fluid chamber in fluid communication with the interior surface of the second diaphragm and a second fluid chamber in fluid communication with the exterior surface of the second diaphragm. The second pressure sensor includes a first port in fluid communication with the first fluid chamber of the second pressure sensor and a second port in fluid communication with the second fluid chamber of the second pressure sensor. A plurality of electrical contacts are in electrical communication with the second pressure sensor chip. The first port of the second pressure sensor is adapted to be placed in fluid communication with a source of fluid pressure and the second port of the second pressure sensor is adapted to be placed in fluid communication with a source of fluid pressure. The second pressure sensor is inverted with respect to the first pressure sensor with the second plane being generally parallel to the first plane. The second pressure sensor is adapted to provide a second electrical output signal representing a fluid pressure measured by the second diaphragm. The first and second electrical output signals are combined into a combined electrical output signal wherein false readings of a change of pressure measured by the first pressure sensor, due to movement of the manometer, contained in the first electrical output signal are cancelled by counterpart false readings of a change in pressure measured by the second pressure sensor, also due to movement of the manometer, contained in the second electrical output signal such that the combined electrical output signal provides an accurate indication of the fluid pressure regardless of movement of the manometer.

BRIEF DESCRIPTION OF THE DRAWING FIGURES

FIG. 5 is a top plan view of a pressure sensor.

FIG. 6 is a front elevational view of the pressure sensor of FIG. 5.

FIG. 7 is an enlarged top plan view of a pressure sensor with its cover removed.

FIG. 8 is a cross-sectional view taken along line 8—8 of FIG. 7.

DETAILED DESCRIPTION OF THE PREFERRED EMBODIMENTS

Figure 1:
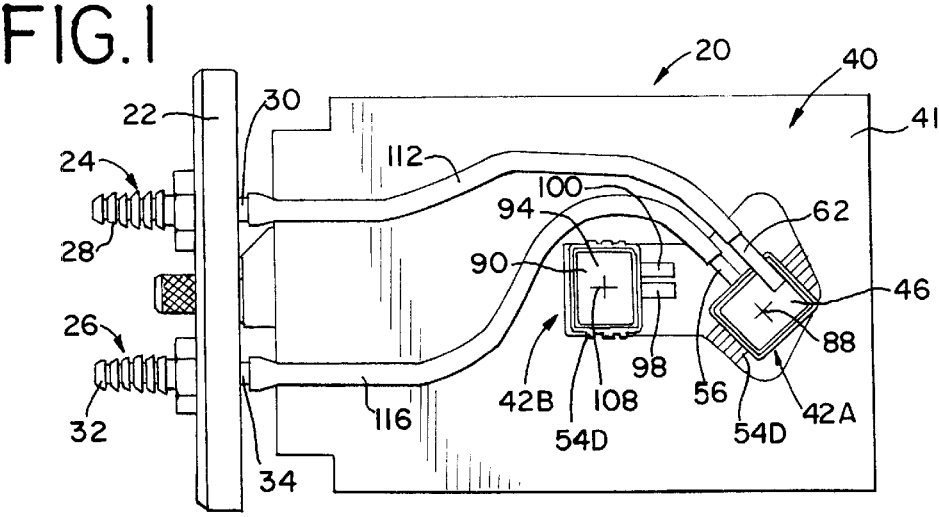
FIG. 1 is a top plan view of a manometer of the present invention including dual pressure sensors.
Figure 2:
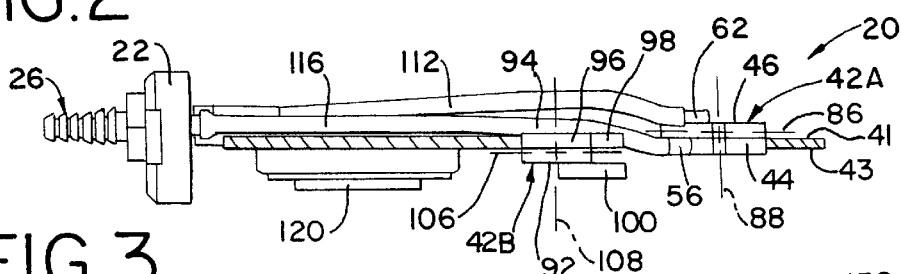
FIG. 2 is a partial cross-sectional view of the manometer of FIG. 1.

The manometer 20 of the present invention, as shown in FIGS. 1 and 2, is a hand-held manometer used to sense and measure positive, negative or differential fluid pressures. The manometer 20 is shown in FIGS. 1 and 2 with its housing removed for purposes of illustration. The manometer 20 includes a face plate 22. A first nipple 24 and a second nipple 26 are attached to the face plate 22. The first nipple 24 includes a serrated first end 28 located on the exterior side of the face plate 22 and a second end 30 located on the interior side of the face plate 22. The first nipple 24 includes a hollow bore that extends from the first end 28 to the second end 30. The second nipple 26 includes a serrated first end 32 located on the outside of the face plate 22 and a second end 34 located on the interior side of the face plate 22. The second nipple 26 includes a hollow bore that extends from the first end 32 to the second end 34. The first end 28 of the first nipple 24 and the first end 32 of the second nipple 26 are each adapted to be removably attached to a respective conduit such as a tube or hose which is in fluid communication with a fluid pressure source for which a pressure measurement is to be taken.

A circuit board 40 is attached at one end to the face plate 22 and is adapted to be located within the housing (not shown) of the manometer 20. The circuit board 40 includes a top surface 41 and a bottom surface 43. A first pressure sensor 42A and a second pressure sensor 42B are attached to the circuit board 40. The pressure sensors 42A and 42B are constructed substantially identical to one another. The pressure sensors 42A and 42B each provide a respective electrical output signal that corresponds to a pressure as measured by the sensor. One type of pressure sensor that may be used for each of the pressure sensors 42A and 42B is pressure sensor Model SLP004DD4 as manufactured by Sensym, Inc. of Milpitas, Calif.

The sensor 42A is shown in greater detail in FIGS. 5–8. The pressure sensor 42A includes a housing 44 and a cover 46 attached to the housing 44. The housing 44 includes a bottom wall 48 and an upwardly extending peripheral sidewall 50 that extends around the perimeter of the bottom wall 48. A cavity 52 is formed in the top of the bottom wall 48. The housing 44 includes a plurality of electrical contacts 54A–F. Each electrical contact 54A–F extends from a first end located in the interior of the housing 44 adjacent the cavity 52 to a second end located exterior of the housing 44. The housing 44 includes a port 56 which extends outwardly from the sidewall 50. The tip of the port 56 includes an orifice 58. The port 56 includes a hollow bore that is in fluid communication with the orifice 58. The cover 46 of the pressure sensor 42A is substantially planar and is adapted to close and seal the top end of the sidewall 50 of the housing 44. The cover 46 includes a port 62 attached to the outer surface of the cover 46 that includes a tip having an orifice 64. The port 62 includes a hollow bore that is in fluid communication with the orifice 64.

The sensor 42A includes a silicon pressure sensor chip or die 70 located within the cavity 52 and attached to the bottom wall 48 of the housing 44. The chip 70 includes a thin and planar plate-like diaphragm 72 having an interior first surface 74 and an exterior second surface 76. The diaphragm 72 forms an interior first fluid chamber 78 that is in fluid communication with the first surface 74 of the diaphragm 72 and an exterior second fluid chamber 80 that is in fluid communication with the second surface 76 of the diaphragm 72 within the sensor 42A. The first chamber 78 and the second chamber 80 are sealed fluid tight from one another. The first chamber 78 is in fluid communication with the orifice 64 of the port 62 in the cover 46. The second chamber 80 is in fluid communication with the orifice 58 of the port 56 in the housing 44. The chip 70 is electrically connected to each of the electrical contacts 54A–F by a respective electrical lead 82. As best shown in FIG. 8, the diaphragm 72 is located in a plane 86. The plane 86 is located between and substantially parallel to the bottom wall 48 of the housing 44 and the cover 46. The sensor 42A also includes a linear central axis 88 that extends generally centrally through the diaphragm 70 and generally perpendicular to the diaphragm 72 and to the plane 86.

The pressure sensor 42B as shown in FIGS. 1 and 2 includes a housing 90 and a cover 92. The housing 90 includes a bottom wall 94 and a peripheral sidewall 96. The housing 90 includes a port 98. The cover 92 includes a port 100. Other parts of the pressure sensor 42B that correspond to the same parts of the pressure sensor 42A are identified with the same reference number. The pressure sensor 42B includes a pressure sensor chip having a diaphragm that forms a first chamber and a second chamber as does the pressure sensor 42A. The diaphragm of the pressure sensor 42B is located in a plane 106. The pressure sensor 42B includes a linear central axis 108 that extends concentrically through the diaphragm of the pressure sensor 42B and generally perpendicular to the diaphragm and to the plane 106. The port 98 of the housing 90 includes an orifice at its outer end that is in fluid communication with the second chamber formed by the diaphragm of the pressure sensor 42B. The port 100 includes an orifice at its outer end that is in fluid communication with the first chamber formed by the diaphragm of the pressure sensor 42B.

As best shown in FIG. 1, the pressure sensor 42A is attached to the circuit board 40 by the electrical contacts 54A–F. The pressure sensor 42A is attached to the circuit board 40 such that the diaphragm 72 and the plane 86 are substantially parallel to the circuit board 40. The pressure sensor 42A is positioned in an upright position as shown in the FIGS. 1 and 2 such that the port 62 of the cover 46 is located above the port 56 of the housing 44 and the first chamber 78 is located above the second chamber 80. The pressure sensor 42B is attached to the circuit board 40 by its electrical contacts 54A–F. As shown in FIGS. 1 and 2, the pressure sensor 42B is installed in an inverted or upside down position with respect to the pressure sensor 42A such that the port 100 of the cover 92 is located below the port 98 of the housing 90 and such that the first chamber formed by the diaphragm is located below the second chamber formed by the diaphragm of the sensor 42B. The plane 106 of the sensor 42B is located substantially parallel to the plane 86 of the sensor 42A. Similarly, the diaphragms in the pressure sensors 42A and 42B are substantially parallel with respect to one another.

As shown in FIGS. 1 and 2 the pressure sensor 42B is "inverted," "upside down," or "rotated one-hundred eighty degrees" with respect to the sensor 42A. The sensor 42B is also shown in FIGS. 1 and 2 as being rotated approximately forty-five degrees about the axis 88 after being inverted from the position in which the sensor 42A is shown. As used herein, when a sensor is said to be "inverted," "upside down," or "rotated one-hundred eighty degrees", that means the sensor has been rotated one hundred eighty degrees about an axis within the plane 86 or 106 of the sensor, and not a one-hundred eighty degree rotation of the sensor about the central axis 88 or 108 of the sensor. The rotation of the sensor 42B about the axis 88 is merely for convenience of location.

As shown in FIGS. 1 and 2, a hollow conduit 112 such as a tube or hose is attached at one end to the second end 30 of the first nipple 24 and is attached at a second end to the port 62 of the pressure sensor 42A. The conduit 112 thereby connects the orifice at the first end 28 of the first nipple 24 in fluid communication with the first chamber 78 of the pressure sensor 42A. A conduit 116 is attached at one end to the second end 34 of the second nipple 26 and at a second end to the port 56 of the pressure sensor 42A. The conduit 116 thereby connects the orifice at the first end 32 of the second nipple 26 in fluid communication with the second chamber 80 of the pressure sensor 42A. The ports 98 and 100 of the pressure sensor 42B are not placed in fluid communication with the nipples 24 and 26, or with the pressure sensor 42A, but are in fluid communication with the atmosphere.

Figure 9:
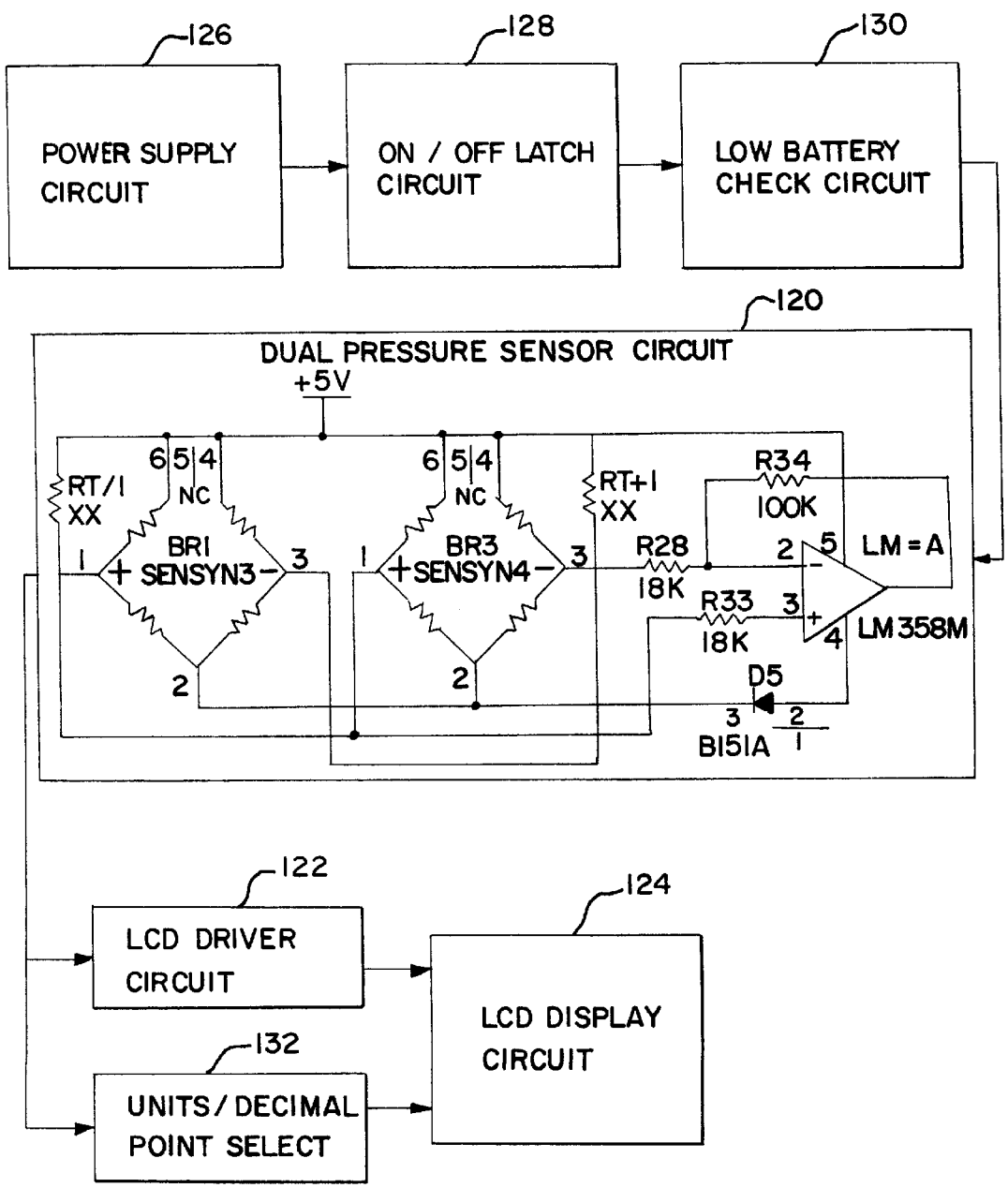
FIG. 9 is an electrical schematic of a dual pressure sensor circuit.

The pressure sensor 42A is pressure active, changing its electrical pressure output signal with changes in the pressure of the fluids contained within the conduits 112 and 116. The pressure sensor 42B is not physically connected to the fluid pressure source which is to be measured, but is electrically connected with the pressure sensor 42A in a sensor circuit 120 as shown in FIG. 9. The pressure sensors 42A and B are electrically connected in parallel to one another. The respective electrical pressure signals generated by each pressure sensor 42A and 42B are combined in the sensor circuit 120 into a combined electrical pressure signal that is fed into an amplifier circuit. The combined signal is transmitted to a liquid crystal display driver circuit 122 for driving a liquid crystal display circuit 124 which displays the pressure reading on a liquid crystal display. As shown in FIG. 9, the manometer 20 also includes a power supply circuit 126, an on/off electrical circuit 128 and a low battery check circuit 130. The manometer 20 may also include a unit/decimal point selection circuit 132 which allows the pressure reading to be visually displayed on the liquid crystal display in English or metric units. The low battery circuit 130 alerts the user of the battery status of the manometer 20. Over-current protection in the form of a resettable fuse may be included that will protect the manometer 20 from short circuits.

When the manometer 20 is moved while taking a pressure reading, and the position of the diaphragm 72 of the pressure sensor 42A is correspondingly moved, the electrical pressure signal generated by the pressure sensor 42A will change due to a sensed change in the total force applied to the diaphragm due to the pull of gravity on the diaphragm 72. A similar change will result in the electrical pressure signal generated by the pressure sensor 42B due to the corresponding change in the position of the diaphragm of the pressure sensor 42B and the gravitational pull on that diaphragm. The electrical pressure signal generated by the pressure sensor 42B is used to correct the electrical pressure signal generated by the pressure sensor 42A such that when the two signals are combined, the changes to each signal, which represent a false reading of a change in measured pressure due to the effect of gravity on the diaphragm, cancel each other out such that the resulting combined electrical pressure signal provides an accurate pressure reading. As the pressure sensors 42A and B are inverted with respect to one another, the gravitational effect on the diaphragms of the sensors produce inverted signal components, the net effect being a canceling of the change in the electrical output signal due to any position change of the manometer 20 and the effect of gravity. The manometer 20 may thereby be used to measure low pressures such as 1.0 inches of water column, with no effect on the sensitivity or accuracy of a pressure measurement resulting from a change in the position of the manometer 20.

Figure 3:
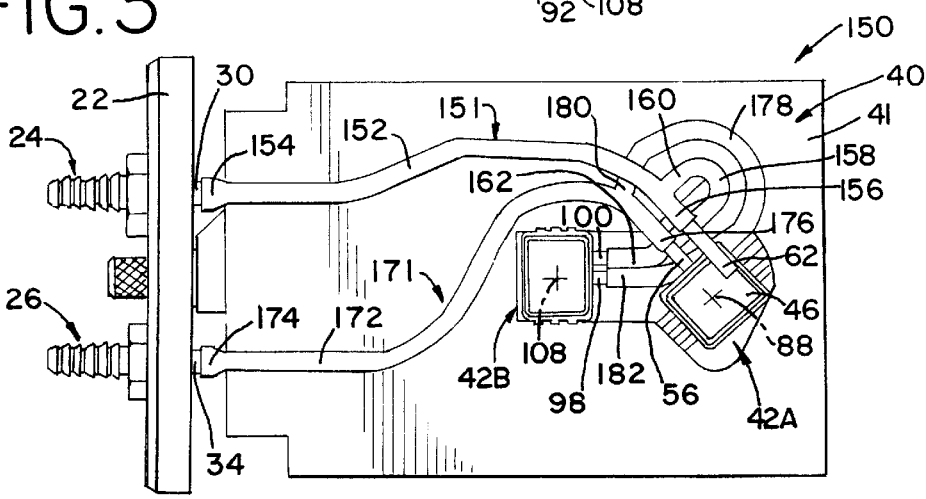
FIG. 3 is a top plan view of a modified embodiment of the manometer of the present invention.
Figure 4:
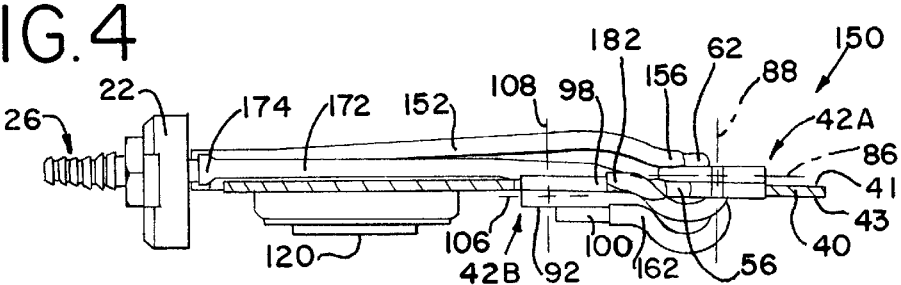
FIG. 4 is a partial cross-sectional view of the manometer of FIG. 3.

A modified embodiment of the manometer of the present invention is shown in FIGS. 3 and 4 and is identified with reference number 150. The manometer 150 includes many of the same components as the manometer 20 and therefore like parts are numbered with the same reference number for the manometer 150. The manometer 150 is constructed in substantially in the same manner as the manometer 20 other than the manner in which the nipples 24 and 26 are connected to the pressure sensors 42A and 42B. The manometer 150 includes pressure sensors 42A and 42B that are electrically connected to a pressure sensor circuit 120 as in the manometer 20. The pressure sensors 42A and 42B are connected to the circuit board 40 in the same manner as in the manometer 20, such that the pressure sensor 42B is inverted with respect to the pressure sensor 42A.

The manometer 150 includes a conduit 151 having a first conduit leg 152. The first conduit leg 152 has a first end 154 connected in fluid communication with the second end 30 of the first nipple 24 and a second end 156 connected in fluid communication with the port 62 of the cover 46 of the pressure sensor 42A. The conduit 151 also includes a second conduit leg 158 having a first end 160 attached in fluid communication with the first conduit leg 152 and a second end 162 attached in fluid communication with the port 100 of the cover 92 of the pressure sensor 42B. The conduit 151 thereby connects the ports 62 and 100 of the pressure sensors 42A and 42B in fluid communication with one another and in fluid communication with the first nipple 24.

The manometer 150 also includes a conduit 171 having a first conduit leg 172. The first conduit leg 172 includes a first end 174 attached in fluid communication with the second end 34 of the second nipple 26 and a second end 176 attached in fluid communication with the port 56 of the housing 44 of the pressure sensor 42A. The conduit 171 includes a second conduit leg 178 having a first end 180 attached in fluid communication with the first conduit leg 172 and a second end 182 attached in fluid communication with the port 98 of the housing 90 of the pressure sensor 42B. The conduit 171 thereby connects the ports 56 and 98 of the pressure sensors 42A and 42B in fluid communication with one another and in fluid communication with the second nipple 26.

In the manometer 150 both pressure sensors 42A and 42B are pressure active in that they are both connected in fluid communication with the nipples 24 and 26 and thereby to the pressure source that is to be measured. As the pressure sensors 42A and 42B are inverted with respect to one another, any change in position of the manometer 150 that results in a change in the output pressure signal of one of the pressure sensors 42A or B is nullified by a corresponding change in the output electrical pressure signal of the other pressure sensor 42A or B. The resulting combined electrical pressure signal from the two pressure sensors 42A and B remains unaffected by changes in position of the manometer 150 due to gravitational forces applied to the diaphragms of the pressure sensors 42A and B. In the manometer 150 the combined electrical pressure signal from the two pressure active pressure sensors 42A and 42B results in improved accuracy of pressure measurement.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A manometer for measuring fluid pressure, said manometer including:

a first pressure sensor including a first housing, a first fluid chamber, a second fluid chamber, a first pressure sensor chip located in said first housing, said first pressure sensor chip including a first diaphragm having an interior surface in fluid communication with said first fluid chamber and an exterior surface in fluid communication with said second fluid chamber, said first diaphragm being located in a first plane, a first port in fluid communication with said first fluid chamber, a second port in fluid communication with said second fluid chamber, and a plurality of electrical contacts in electrical communication with said first pressure sensor chip, said first pressure sensor adapted to provide a first electrical output signal representing a fluid pressure measured by said first diaphragm;

a second pressure sensor including a second housing, a first fluid chamber, a second fluid chamber, a second pressure sensor chip located in said second housing, said second pressure sensor chip including a second diaphragm having an interior surface in fluid communication with said first fluid chamber and an exterior surface in fluid communication with said second fluid chamber of said second pressure sensor, said second diaphragm being located in a second plane, a first port in fluid communication with said first fluid chamber and a second port in fluid communication with said second fluid chamber of said second pressure sensor, and a plurality of electrical contacts in electrical communication with said second pressure sensor chip, said first port of said first pressure sensor and said first port of said second pressure sensor adapted to be placed in fluid communication with a first source of fluid pressure, and said second port of said first pressure sensor and said second port of said second pressure sensor adapted to be placed in fluid communication with a second source of fluid pressure, said second pressure sensor being inverted with respect to said first pressure sensor with said second plane being generally parallel to said first plane, said second pressure sensor adapted to provide a second electrical output signal representing a fluid pressure measured by said second diaphragm;

whereby said second electrical output signal is adapted to be combined with said first electrical output signal to correct changes in the first electrical output signal caused by movement of said manometer such that the combined electrical output signal provides an accurate indication of fluid pressure.

2. The manometer of claim 1 wherein each said electrical contact of said first pressure sensor is connected in parallel with a counterpart electrical contact of said second pressure sensor.

3. The manometer of claim 1 wherein said first port of said second pressure sensor is in fluid communication with said first port of said first pressure sensor, and said second port of said second pressure sensor is in fluid communication with said second port of said first pressure sensor.

4. The manometer of claim 1 wherein said first pressure sensor includes a first cover, said second fluid chamber of said first pressure sensor being formed at least in part by said first cover, and wherein said second pressure sensor includes a second cover, said second fluid chamber of said second pressure sensor being formed at least in part by said second cover.

5. The manometer of clam 1 wherein said first housing of said first pressure sensor includes a first bottom wall, said first fluid chamber of said first pressure sensor being located between said first diaphragm and said first bottom wall, and wherein said second housing of said second pressure sensor includes a second bottom wall, said first fluid chamber of said second pressure sensor being located between said second diaphragm and said second bottom wall.

6. A manometer for measuring fluid pressure, said manometer including:

a first pressure sensor including a first housing, a first fluid chamber, a second fluid chamber, a first pressure sensor chip located in said first housing, said first pressure sensor chip including a first diaphragm having an interior surface in fluid communication with said first fluid chamber and an exterior surface in fluid communication with said second fluid chamber, said first diaphragm being located in a first plane, a first port in fluid communication with said first fluid chamber, a second port in fluid communication with said second fluid chamber, and a plurality of electrical contacts in electrical communication with said first pressure sensor chip, said first port adapted to be placed in fluid communication with a source of fluid pressure, said second port adapted to be placed in fluid communication with a source of fluid pressure, said first pressure sensor adapted to provide a first electrical output signal representing a fluid pressure measured by said first diaphragm;

a second pressure sensor including a second housing, a first fluid chamber, a second fluid chamber, a second pressure sensor chip located in said second housing, said second pressure sensor chip including a second diaphragm having an interior surface in fluid communication with said first fluid chamber and an exterior surface in fluid communication with said second fluid chamber of said second pressure sensor, said second diaphragm being located in a second plane, a first port in fluid communication with said first fluid chamber and a second port in fluid communication with said second fluid chamber of said second pressure sensor, and a plurality of electrical contacts in electrical communication with said second pressure sensor chip, said first port of said second pressure sensor adapted to be placed in fluid communication with the atmosphere, said second port of said second pressure sensor adapted to be placed in fluid communication with the atmosphere, said second pressure sensor being inverted with respect to said first pressure sensor with said second plane being generally parallel to said first plane, said second pressure sensor adapted to provide a second electrical output signal representing a fluid pressure measured by said second diaphragm;

whereby said second electrical output signal is adapted to be combined with said first electrical output signal to correct changes in the first electrical output signal caused by movement of said manometer such that the combined electrical output signal provides an accurate indication of fluid pressure.

7. The manometer of claim 6 wherein each said electrical contact of said first pressure sensor is connected in parallel with a counterpart electrical contact of said second pressure sensor.

8. The manometer of claim 6 wherein said first pressure sensor includes a first cover, said second fluid chamber of said first pressure sensor being formed at least in part by said first cover, and wherein said second pressure sensor includes a second cover, said second fluid chamber of said second pressure sensor being formed at least in part by said second cover.

9. The manometer of claim 6 wherein said first housing of said first pressure sensor includes a first bottom wall, said first fluid chamber of said first pressure sensor being located between said first diaphragm and said first bottom wall, and wherein said second housing of said second pressure sensor includes a second bottom wall, said first fluid chamber of said second pressure sensor being located between said second diaphragm and said second bottom wall.

* * * * *